(12) United States Patent
Madsen (10) Patent No.: US 8,954,067 B2
(45) Date of Patent: Feb. 10, 2015

(54) METHOD AND APPARATUS FOR EMULATING A PLURALITY OF SUBSCRIPTIONS

(75) Inventor: Jens Ole Madsen, Frederiksberg C (DK)

(73) Assignee: Nokia Corporation, Espoo (FI)

( * ) Notice: Subject to any disclaimer, the term of this patent is extended or adjusted under 35 U.S.C. 154(b) by 297 days.

(21) Appl. No.: 13/336,828

(22) Filed: Dec. 23, 2011

(65) Prior Publication Data
US 2013/0165073 A1    Jun. 27, 2013

(51) Int. Cl.
*H04W 4/00* (2009.01)
*H04B 1/38* (2006.01)

(52) U.S. Cl.
USPC .................. 455/435.1; 455/557; 455/558

(58) Field of Classification Search
USPC ............... 455/407, 418–422.1, 432.3, 433, 455/435.1–435.3, 550.1, 553.1, 556.1–558, 455/560, 561, 435.1–435.3
See application file for complete search history.

(56) References Cited

U.S. PATENT DOCUMENTS

| | | | |
|---|---|---|---|
| 6,738,622 | B1 | 5/2004 | Heutschi et al. |
| 7,505,769 | B2 | 3/2009 | Jiang |
| 2005/0164737 | A1 | 7/2005 | Brown |
| 2008/0064443 | A1* | 3/2008 | Shin et al. ............. 455/558 |
| 2010/0035651 | A1* | 2/2010 | Dong ...................... 455/558 |
| 2012/0108206 | A1* | 5/2012 | Haggerty ................ 455/411 |
| 2012/0122423 | A1 | 5/2012 | Helmreich |
| 2013/0121483 | A1* | 5/2013 | Murakami et al. ..... 379/212.01 |

FOREIGN PATENT DOCUMENTS

| | | |
|---|---|---|
| KR | 101026247 B | 3/2011 |
| WO | WO-2009/133410 A2 | 11/2009 |
| WO | WO 2013/038236 A1 | 3/2013 |

OTHER PUBLICATIONS

*Characteristics of the Universal Subscriber Identity Module (USIM) Application; 3GPP TS* 31.102 (Oct. 1999) Retrieved on May 1, 2013 from: URL www.3gpp.org/ftp/tsg_t/tsg_t/TSGT_05/Docs/PDFs/TP-99186.pdf pp. 1-94.
International Search Report and Written Opinion for Application No. PCT/FI2012/051204, dated Apr. 3, 3013.

* cited by examiner

*Primary Examiner* — San Htun
(74) *Attorney, Agent, or Firm* — Alston & Bird LLP (57) ABSTRACT

Various methods are provided for facilitating a software smart card environment consisting of multiple virtual UICCs (vUICC) hosting a plurality of SIMS or U-SIMS. One example method may comprise receiving a network authentication request from a first network operator. The method may also comprise causing, using a processor, a UICC to activate a subscription for the first network operator and deactivate a subscription for a second network operator in an instance in which the subscription for the first network operator is not the active subscription. The method may further comprise determining a vUICC identification relating to the requested application. The method may further comprise causing authentication information to be transmitted to the first network operator based on the subscription for the first network operator. Similar and related example apparatuses and example computer program products are also provided.

17 Claims, 6 Drawing Sheets

METHOD AND APPARATUS FOR EMULATING A PLURALITY OF SUBSCRIPTIONS

TECHNOLOGICAL FIELD

Embodiments of the present invention relate generally to smart card technology and, more particularly, relate to a method, apparatus, and computer program product for emulating a plurality of subscriptions.

BACKGROUND

A universal integrated circuit card (UICC) is a smart card designed for use in mobile terminals. In a Global System for Mobile Communications (GSM) network, the UICC contains a subscriber identity module or subscriber identification module (SIM) application, in a Universal Mobile Telecommunications System (UTMS) or a Time Division-Synchronous Code Division Multiple Access (TD-SCDMA) network a SIM or a universal SIM (U-SIM), and in an LTE network a universal SIM (USIM). In a CDMA2000 network, the UICC contains a Removable User Identity Module (R-UIM). The UICC may come in the form of a removable chip that is insertable in a mobile terminal, it may take the form of a chip that is embedded (eUICC) in the mobile terminal and/or it may take the form of a software based UICC e.g. a virtual UICC (vUICC). A vUICC may be implemented as a virtual SIM application that contains a profile that enables access to a network. For example, a profile may consist of the data, authentication algorithms, cryptographic keys, and/or the like, which makes up a subscription.

Dual SIM mobile terminals are currently very popular. These dual SIM mobile terminals normally have two slots for UICCs (e.g. SIM cards). In the most common type of Dual SIM mobile terminals, the mobile terminals can be attached to two networks, corresponding to the two subscriptions (e.g. one subscription on each SIM card), at the same time, and can "listen" for incoming calls on the two networks simultaneously. However, when the mobile terminal is on a call using one of the two subscriptions, the mobile terminal cannot at the same time "listen" for incoming calls using the other subscription. This is also known as "Dual Standby" (as opposed to "Dual Call). A Dual Standby mobile terminal will typically have one radio while a Dual Call phone has two radios.

In order to use an eUICC in a Dual SIM mobile terminal, it would normally be necessary to embed two eUICCs in the mobile terminal, or in some cases embed one eUICC and include one removable UICC because only one profile can be active in a eUICC at any time. Including more than one UICC and/or eUICC means extra cost (to eUICC and/or UICC reader), and also added complexity for the mobile terminals user, since the user has to understand that only one subscription from each eUICC can be active at any time.

BRIEF SUMMARY

Methods, apparatuses, and computer program products are provided herein for facilitating a UICC environment consisting of multiple virtual UICCs (vUICC) operating on either a physical UICC or a eUICC. In an embodiment, multiple vUICCs may be configured as independent UICCs and they may be hosted by a eUICC. In particular, the method, apparatus and computer program product of example embodiments of the present invention are configured to enable two or more subscriptions (e.g. profiles), implemented on two or more vUICCs, that are configured to emulate multiple active network subscriptions that result in at least a dual SIM environment.

In one embodiment, a method is provided that comprises receiving a network authentication request from a first network operator. The method of this embodiment may also include causing, using a processor, a UICC to activate a subscription for the first network operator and deactivate a subscription for a second network operator in an instance in which the subscription for the first network operator is not the active subscription. The method of this embodiment may also include causing authentication information to be transmitted to the first network operator based on the subscription for the first network operator.

In another embodiment, an apparatus is provided that includes at least one processor and at least one memory including computer program code with the at least one memory and the computer program code being configured, with the at least one processor, to cause the apparatus to at least receive a network authentication request from a first network operator. The at least one memory and computer program code may also be configured to, with the at least one processor, cause the apparatus to cause a UICC to activate a subscription for the first network operator and deactivate a subscription for a second network operator in an instance in which the subscription for the first network operator is not the active subscription. The at least one memory and computer program code may also be configured to, with the at least one processor, cause the apparatus to cause authentication information to be transmitted to the first network operator based on the subscription for the first network operator.

In the further embodiment, a computer program product may be provided that includes at least one non-transitory computer-readable storage medium having computer-readable program instructions stored therein with the computer-readable program instructions including program instructions configured to receive a network authentication request from a first network operator. The computer-readable program instructions may also include program instructions configured to cause a UICC to activate a subscription for the first network operator and deactivate a subscription for a second network operator in an instance in which the subscription for the first network operator is not the active subscription. The computer-readable program instructions may also include program instructions configured to cause authentication information to be transmitted to the first network operator based on the subscription for the first network operator.

In yet another embodiment, an apparatus is provided that includes means for receiving a network authentication request from a first network operator. The apparatus of this embodiment may also include means for causing, using a processor, a UICC to activate a subscription for the first network operator and deactivate a subscription for a second network operator in an instance in which the subscription for the first network operator is not the active subscription. The apparatus of this embodiment may also include means for causing authentication information to be transmitted to the first network operator based on the subscription for the first network operator.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (comprising digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, comprising in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Figure 1:
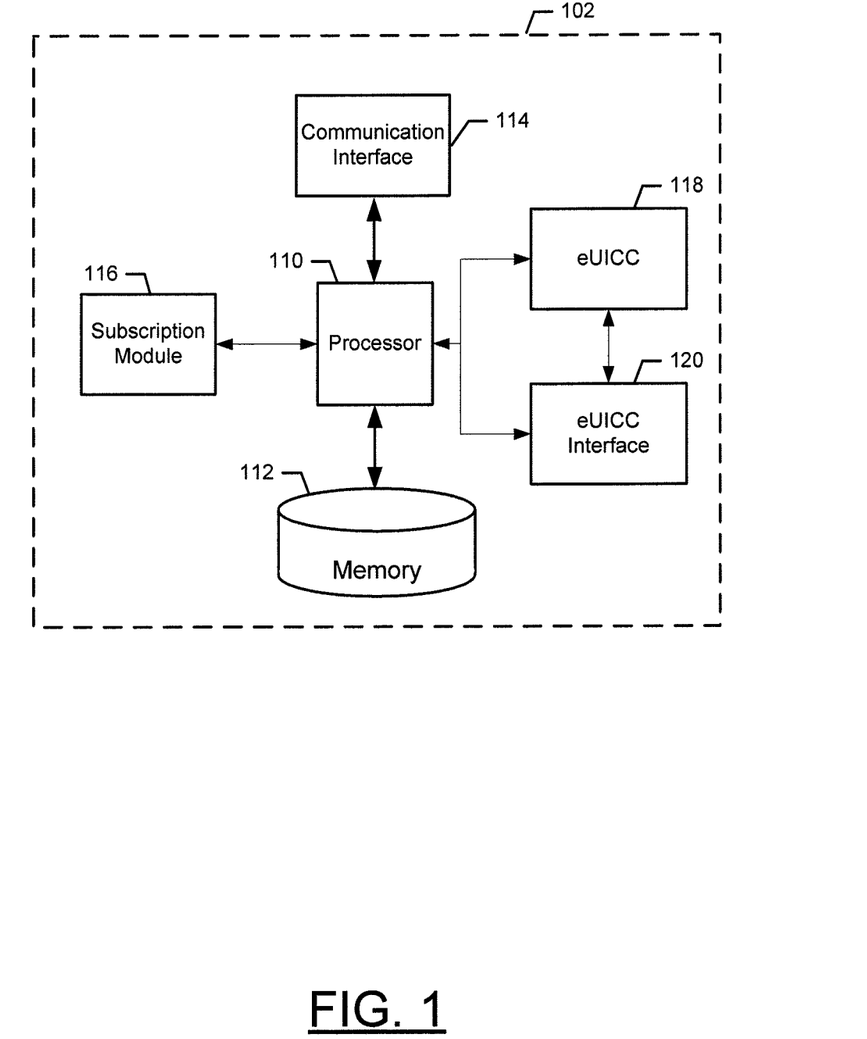
FIG. 1 illustrates a block diagram of a subscription management system for facilitating the use of a eUICC and/or a UICC with two or more active subscriptions according to some example embodiments of the present invention.

FIG. 1 illustrates a block diagram of a subscription management system 102 for facilitating the use of a eUICC and/or a UICC with two or more active subscriptions (e.g. profiles that are configured to authenticate a mobile terminals operation on a network) according to some example embodiments of the present invention. As used herein, an eUICC is distinct from a UICC. However some example embodiments of the current invention may operate both on an eUICC and a UICC. It will be appreciated that the subscription management system 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating an eUICC environment, other configurations, such as a configuration that is similar to that of the subscription management system 102 in a physical UICC environment may also be used to implement embodiments of the present invention.

The subscription management system 102 may be embodied as a desktop computer, laptop computer, mobile terminal, tablet, mobile computer, mobile phone, mobile communication device, one or more servers, one or more network nodes, game device, digital camera/camcorder, audio/video player, television device, radio receiver, digital video recorder, positioning device, any combination thereof, and/or the like. In an example embodiment, the subscription management system 102 is embodied as a mobile terminal, such as that illustrated in FIG. 2.

Figure 2:
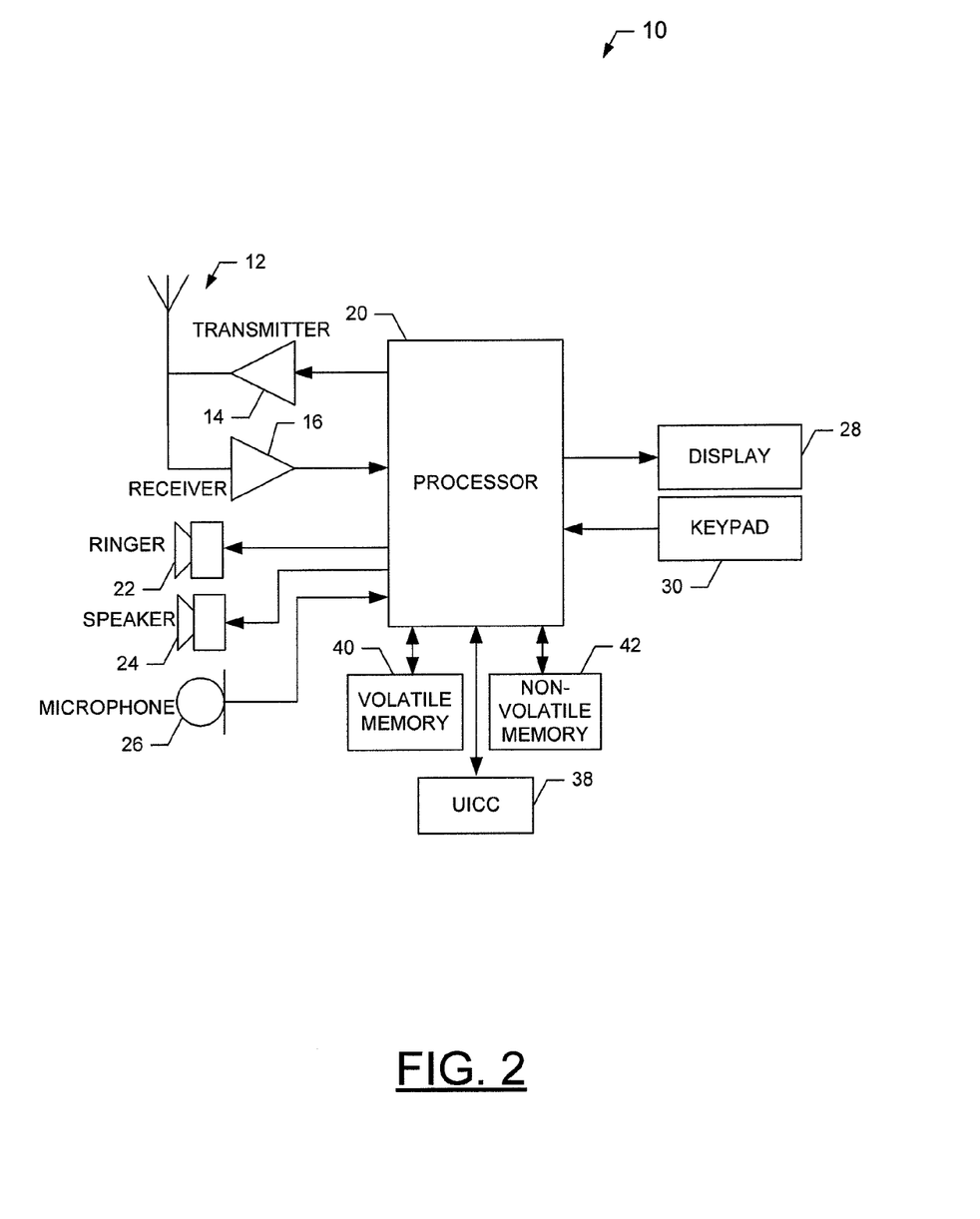
FIG. 2 illustrates a block diagram of an example mobile terminal representative of one embodiment of a subscription management system according to some example embodiments of the present invention.

In this regard, FIG. 2 illustrates a block diagram of a mobile terminal 10 representative of one embodiment of a subscription management system 102. It should be understood, however, that the mobile terminal 10 illustrated and hereinafter described is merely illustrative of one type of subscription management system 102 that may implement and/or benefit from embodiments of the present invention and, therefore, should not be taken to limit the scope of the present invention. While several embodiments of the user terminal (e.g., mobile terminal 10) are illustrated and will be hereinafter described for purposes of example, other types of user terminals, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may comprise an antenna 12 (or multiple antennas 12) in communication with a transmitter 14 and a receiver 16. The mobile terminal 10 may also comprise a processor 20 configured to provide signals to and receive signals from the transmitter and receiver, respectively. The processor 20 may, for example, be embodied as various means comprising circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements comprising integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may comprise signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may comprise speech data, user generated data, user requested data, and/or the like. In this regard, the mobile terminal may be capable of operating with one or more air interface standards, communication protocols, modulation types, access types, and/or the like. More particularly, the mobile terminal 10 may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal 10 may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface comprising, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments comprising a keypad, the keypad may comprise numeric (0-9) and related keys (#, *), and/or other keys for operating the mobile terminal.

The mobile terminal 10 may comprise memory, such as a smart cart, SIM and/or a UICC 38, a removable user identity module (R-UIM), and/or the like, which may store information elements related to a mobile subscriber. In an embodiment, having a eUICC, the SIM and/or UICC 38 may be optional as the SIM functionality may be installed on the eUICC. Alternatively or additionally, the eUICC and the SIM and/or UICC 38 may work together. In addition to the SIM, the mobile terminal may comprise other removable and/or fixed memory. The mobile terminal 10 may comprise other non-transitory memory, such as volatile memory 40 and/or non-volatile memory 42. For example, volatile memory 40 may comprise Random Access Memory (RAM) comprising dynamic and/or static RAM, on-chip or off-chip cache memory, and/or the like. Non-volatile memory 42, which may be embedded and/or removable, may comprise, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

A physical and/or standard UICC, such as UICC 38 may have an internal structure as defined by International Organization of Standardization (ISO)/International Electrotechnical Commission (IEC) 7816-4, which is hereby incorporated by reference. Applications stored on the UICC are generally associated with an Application Dedicated File (ADF). The ADF may be either part of a file structure under the master file (MF) or the ADF may exist separately within the UICC. Generally, applications are part of a tree that are connected to the MF and thus can be selected by a path from the MF. In some cases, applications may be selected by an Application Identifier (AID). For example, an AID may provide a current location of an application within an UICC or Secure Element (SE).

When a UICC is powered up and/or when the UICC is reset, the UICC may be configured to deliver an Answer to Reset (ATR) of up to 32 bytes to the mobile terminal. For example, using the ATR information, the mobile terminal may determine the capabilities and characteristics of the UICC. Other data may be provided to the mobile terminal and may be cached for use by one or more software components.

Returning to FIG. 1, in an example embodiment, the subscription management system 102 comprises various means for performing the various functions herein described. These means may comprise one or more of a processor 110, memory 112, communication interface 114, subscription module 116, eUICC 118, and/or eUICC interface 120. The means of the subscription management system 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

The processor 110 may, for example, be embodied as various means comprising one or more microprocessors with accompanying digital signal processor(s), one or more processor(s) without an accompanying digital signal processor, one or more coprocessors, one or more multi-core processors, one or more controllers, processing circuitry, one or more computers, various other processing elements comprising integrated circuits such as, for example, an ASIC or FPGA, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the subscription management system 102 as described herein. The plurality of processors may be embodied on a single computing device or distributed across a plurality of computing devices collectively configured to function as the subscription management system 102. In embodiments wherein the subscription management system 102 is embodied as a mobile terminal 10, the processor 110 may be embodied as or comprise the processor 20. In an example embodiment, the processor 110 is configured to execute instructions stored in the memory 112 or otherwise accessible to the processor 110. These instructions, when executed by the processor 110, may cause the subscription management system 102 to perform one or more of the functionalities of the subscription management system 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, non-transitory memory, such as volatile memory, non-volatile memory, or some combination thereof. Although illustrated in FIG. 1 as a single memory, the memory 112 may comprise a plurality of memories. The plurality of memories may be embodied on a single computing device or may be distributed across a plurality of computing devices collectively configured to function as the subscription management system 102. In various example embodiments, the memory 112 may comprise, for example, a hard disk, random access memory, cache memory, flash memory, a removable memory card, a compact disc read only memory (CD-ROM), digital versatile disc read only memory (DVD-ROM), an optical disc, circuitry configured to store information, or some combination thereof. In embodiments wherein the subscription management system 102 is embodied as a mobile terminal 10, the memory 112 may comprise the volatile memory 40 and/or the non-volatile memory 42. The memory 112 may be configured to store information, data, applications, instructions, or the like for enabling the subscription management system 102 to carry out various functions in accordance with various example embodiments.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data to/from another computing device. For example, the communication interface 114 may be configured to receive application data over a network.

The subscription module 116 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the subscription module 116 is embodied separately from the processor 110, the subscription module 116 may be in communication with the processor 110. The subscription module 116 may further be in communication with one or more of the memory 112, communication interface 114, the eUICC 118 and/or the eUICC interface 120, such as via a bus. In some example embodiments the subscription module is configured to communicate with the eUICC 118 directly, but in other embodiments may be configured to be communication with eUICC 118 via eUICC interface 120.

The eUICC interface 120 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the eUICC interface 120 is embodied separately from the processor 110, eUICC interface 120 may be in communication with the processor 110. The eUICC interface 120 may further be in communication with one or more of the memory 112, communication interface 114, the eUICC 118 and/or the subscription module 116, such as via a bus. The eUICC interface 120 is further configured to interface and/or be in communication with a physical UICC, a eUICC and/or a vUICC.

In embodiments of the present invention, the subscription module 116 may be configured to manage the two or more subscriptions that are operable on the eUICC 118. For example, the subscription module 116 may be configured to select and/or activate two (e.g. a subscription for a first network operator, a subscription for second network operator or the like) of the two or more subscriptions available subscriptions to be active. The subscription module 116 may choose these two active subscriptions based on user preferences, preset defaults, indications received from a user, via for example a user interface operating on a display 28, based on a current location, based on network access costs and/or the like. The selection by the subscription module 116 may occur during startup or initialization of the mobile terminal 10 or selection may occur in response to a request, a received communication, a change in circumstance, a change in data for the eUICC 118 or the like.

In embodiments of the present invention, the eUICC 118 may be configured to host a plurality of subscriptions (e.g. SIM cards). The plurality of subscriptions may be stored in the form of vUICCs in some example embodiments and thus may be configured to operate in the same or similar manner as a standalone UICC, SIM, U-SIM or the like. The eUICC 118 may be configured to provide the subscription module 116 directly or via a eUICC interface 120 with information about each of the vUICCs, for example by using a Protocol and Parameter Selection (PPS) procedure, see ISO/IEC 7816-3 which is hereby incorporated by reference, or in some example embodiments, the eUICC 118 may provide may provide the subscription modem 116 with information about each of the profiles as response to a special APDU (Application Protocol Data Unit) command. The eUICC 118 may provide one or more files/data objects that provide network access information about the vUICCs and the subscriptions they contain (e.g. International Mobile Subscriber Identity (IMSI), network related data and/or the like) as well as vUICC identification information to the subscription module 116 to enable attachment to a network.

Alternatively or additionally, the eUICC 118 and/or the eUICC interface 120 may also be configured to communicate with a remote eUICC that are accessible over the air via the communications interface 114. Alternatively or additionally, vUICCs resident on a eUICC or a UICC may also be accessed in a manner similar to the systems and methods described in PCT application entitled Method and Apparatus for Accessing Virtual Smart Cards by Rune Lindholm filed on Sep. 16, 2011, which is incorporated by reference in its entirety herein.

In some example embodiments, the subscription module 116 may be configured to activate two or more subscriptions. In an instance in which a subscription is activated by the subscription module 116, the subscription module 116 may request an IMSI and other related network access data for each of the two or more subscriptions stored on the eUICC 118. The determined IMSI and other network access data may be stored in the memory 112 and accessible by the processor 110, the communications interface 114 or the like. The IMSI and other network access data may enable attachment or reattachment to a network. In some example embodiments, the eUICC 118, the eUICC interface 120 or the like may require a personal identification number (PIN) verification. In instances in which a PIN is required, a PIN may be requested from the user, or otherwise accessible in the memory 112 and may be transmitted by the subscription module 116 to the eUICC 118.

Advantageously and in some example embodiments, the activated subscriptions may appear to be active to the mobile terminal and/or to a user of the mobile terminal. In operation, the processor 110, the subscription module 116 or the like, may be configured to switch between subscriptions based on user requests, network requests, data changes and/or the like. For example, in an instance in which the processor 110, the subscription module 116 or the like requests access to a subscription that is not involved with active communications, the subscription module 116 may then be configured to switch to another subscription.

The subscription module 116 may be advantageously configured, in some example embodiments, to switch between subscriptions without interrupting other operations on the mobile terminal or without causing the mobile terminal or software components to re-read all data (e.g. IMSI etc.) from the eUICC 118. In other words, the subscription module 116 may be configured to cause the transition between subscriptions while enabling the same or similar eUICC data read from the eUICC during start-up to be used by various software components of the mobile terminal 10. For example, if the change of profiles in the eUICC involves sending a REFRESH (Reset) Card Application Toolkit command to the phone, then the processor 110, the subscription module 116, the eUICC interface 120 or the like would not send any indication about the REFRESH (Reset) command to other parts of the mobile terminal 10, but instead may perform a hidden REFRESH (Reset) command as is shown with reference to FIG. 5. A REFRESH command is described in ETSI TS 102 223 which is incorporated by reference in its entirety herein.

FIGS. 3-6 illustrate example flowcharts and signal flow diagrams of the operations performed by a method, apparatus and computer program product, such as the subscription management system 102 of FIG. 1, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software comprising one or more computer program instructions. For example, one or more of the procedures described above may be embodied by computer program instructions. In this regard, the computer program instructions which embody the procedures described above may be stored by a memory 112 of an apparatus employing an embodiment of the present invention and executed by a processor 110 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3-6, when executed, convert a computer or processing circuitry into a particular machine configured to perform an example embodiment of the present invention. Accordingly, the operations of FIGS. 3-6 define an algorithm for configuring a computer or processing 110, to perform an example embodiment. In some cases, a general purpose computer may be provided with an instance of the processor which performs the algorithm of FIGS. 3-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

Figure 3:
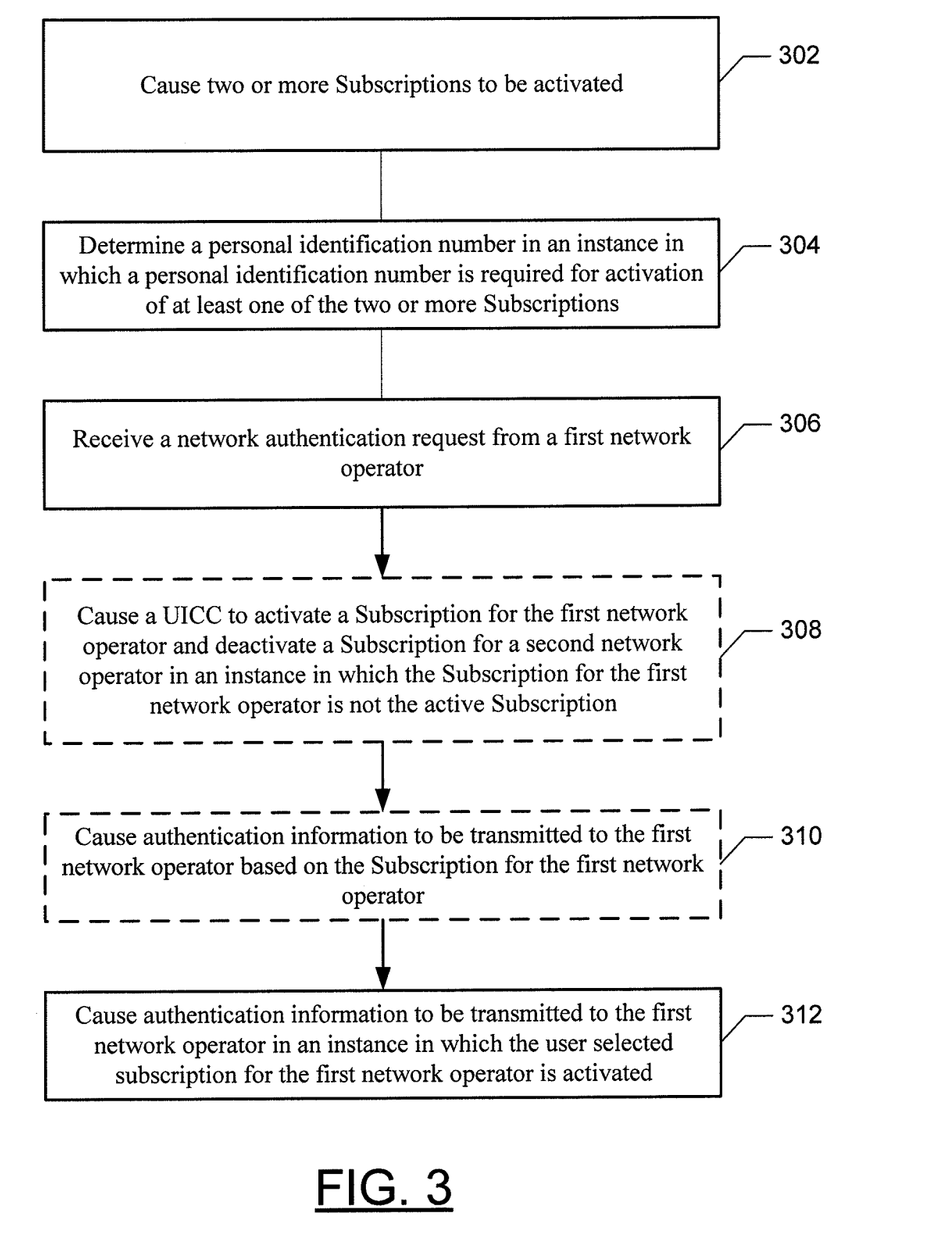
FIG. 3 is an example flowchart illustrating an emulation of multiple subscriptions on a eUICC performed in accordance with some example embodiments of the present invention.

FIG. 3 is an example flowchart illustrating an emulation of multiple subscriptions on a eUICC performed in accordance with some example embodiments of the present invention. As shown in operation 302, the subscription management system 102 embodied, for example, by a mobile terminal 10, may comprise means, such as the processor 110, the subscription module 116, or the like, for causing two or more subscriptions to be activated. In some embodiments, the processor 110, the subscription module 116, or the like may activate a subscription by determining an IMSI and/or network related access data for the subscription. The network data may include other network specific information used to authenticate and identify a subscriber on a network (e.g. Authentication Key (Ki), Local Area Identity (LAI) Operator-Specific Emergency Number, SMSC (Short Message Service Center) number, Service Provider Name (SPN), Service Dialing Numbers (SDN) or the like). A mobile terminal, such as mobile terminal 10, may be configured such as by a processor 110, communications interface 114 or the like, to use an activated subscription to attach to, re-attach to or otherwise be communication with a network. In some example embodiments, the setup process may also include a PIN. As shown in operation 304, the subscription management system 102 embodied, for example, by a mobile terminal 10, may comprise means, such as the processor 110, the subscription module 116, or the like, for determining a personal identification number in an instance in which a PIN is required for activation of at least one of the two or more subscriptions.

As shown in operation 306, the subscription management system 102 embodied, for example, by a mobile terminal 10, may comprise means, such as the processor 110, the communications interface 114, the subscription module 116, or the like, for receiving a network authentication request from a first network operator. For example, the frequency of requests for authentication from a network is set by a network operator and may vary. Most networks request authentication when setting up a call and with varying frequency during a call, networks may request authentication infrequently or not at all when the phone is in standby mode.

In an instance in which the first network is not currently activated, then as shown in operation 308, the subscription management system 102 embodied, for example, by a mobile terminal 10, may comprise means, such as the processor 110, the subscription module 116, or the like, for causing an eUICC to activate a subscription for the first network operator and deactivate a subscription for a second network operator. In some example embodiments, the active subscription on the UICC is configured to be switched and/or transmitted from the subscription for the second network operator, such as by the processor 110, the subscription module 116, the eUICC interface 120 or the like, to the subscription for the first network operator using a refresh command.

However, in some example embodiments and in an instance in which a mobile terminal 10 is actively engaged with a call using either the subscription for the first network operator or for the second network operator, then the mobile terminal 10 may be configured to activate the corresponding subscription on the eUICC 118 and that subscription may be configured by the subscription module 116 to remain active during the duration of the call.

As shown in operation 310, the subscription management system 102 embodied, for example, by a mobile terminal 10, may comprise means, such as the processor 110, the communications interface 114, the subscription module 116, or the like, for causing authentication information to be transmitted to the first network operator based on the user-selected subscription for the first network operator.

In an instance in which the subscription for the first network operator at operation 306 is selected, then as shown in operation 312, the subscription management system 102 embodied, for example, by a mobile terminal 10, may comprise means, such as the processor 110, the communications interface 114, the subscription module 116, or the like, for causing authentication information to be transmitted to the first network operator in an instance in which the user selected subscription for the first network operator is activated. In some instances an authentication request should be responded to within 5 seconds, failure may result in the mobile terminal 10 being dropped from the network and needing to re-attach. An example authentication request is described in 3GPP TS 31.102, which is incorporated herein by reference.

Figure 4:
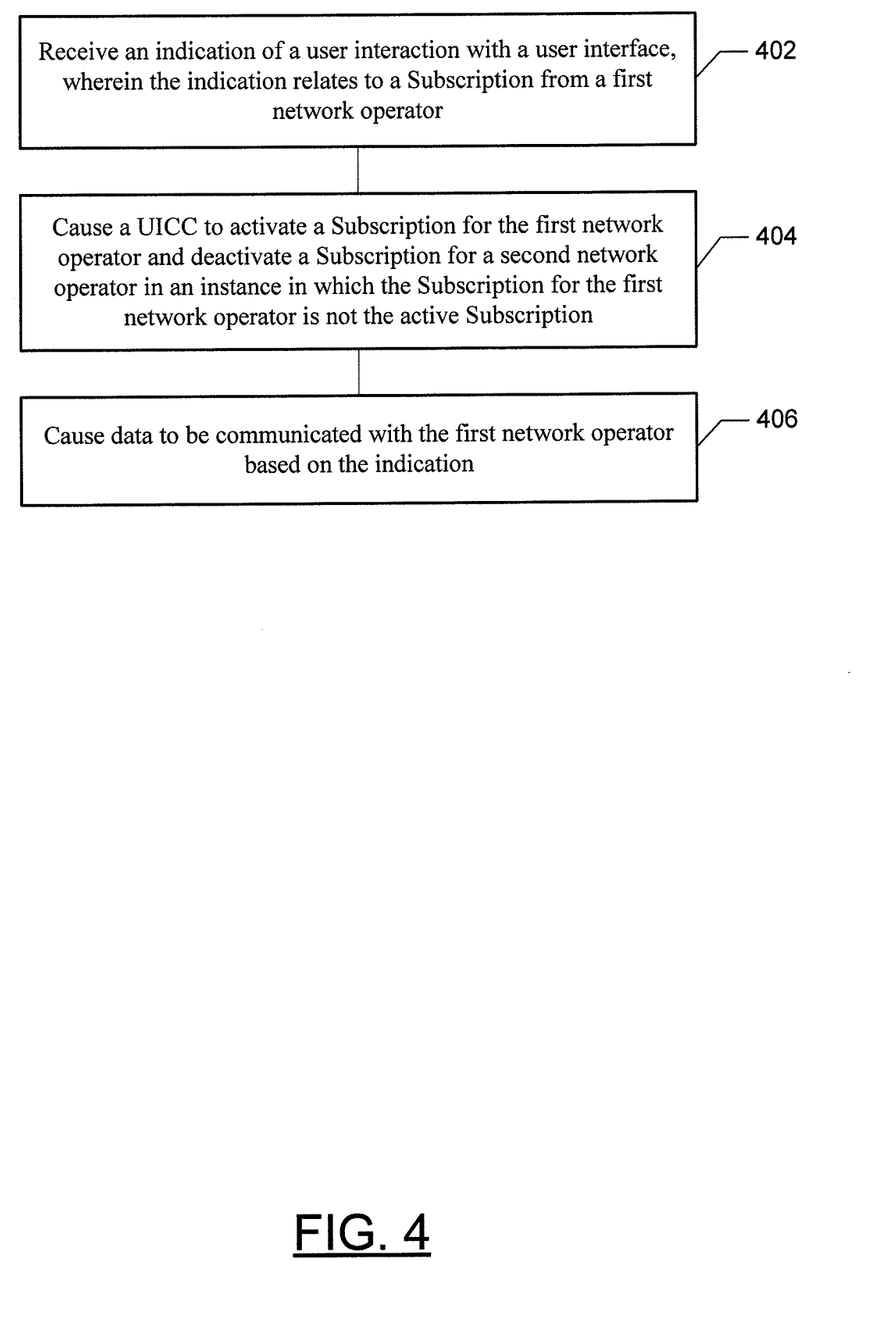
FIG. 4 is an example flowchart illustrating an example method for switching between subscriptions on an eUICC performed in accordance with some example embodiments of the present invention.

FIG. 4 is an example flowchart illustrating an example method for switching between subscriptions on an eUICC performed in accordance with an embodiment of the present invention. As shown in operation 402, the subscription management system 102 embodied, for example, by a mobile terminal 10, may comprise means, such as the processor 110, the communications interface 114, the subscription module 116, or the like, for receiving an indication of a user interaction with a user interface. In some example embodiments, the indication relates to a subscription from a first network operator such as a request for a phone call, text message, data access or the like. As shown in operation 404, the subscription management system 102 embodied, for example, by a mobile terminal 10, may comprise means, such as the processor 110, the subscription module 116, or the like, for causing an eUICC to activate a user-selected subscription for the first network operator and deactivate a subscription for a second network operator in an instance in which the subscription for the first network operator is not the active subscription. As shown in operation 406, the subscription management system 102 embodied, for example, by a mobile terminal 10, may comprise means, such as the processor 110, the communications interface 114, the subscription module 116, or the like, for causing data to be communicated with the first network operator based on the received indication.

Figure 5:
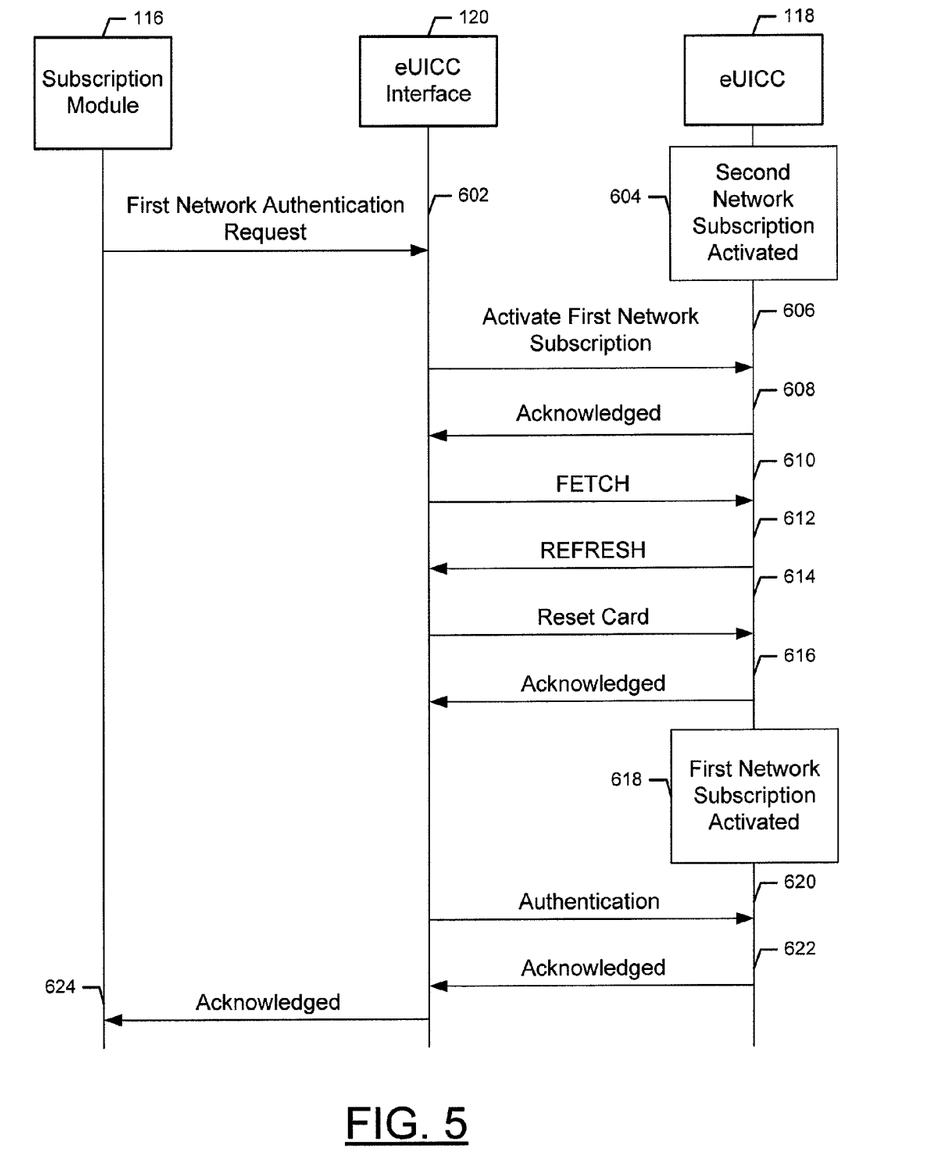
FIG. 5 illustrates an example signal flow diagram for network authentication according to some example embodiments of the present invention.

FIG. 5 illustrates an example signal flow diagram for network authentication according to some example embodiments of the present invention. As is shown with reference to signal 602, a first network authentication request is sent from a subscription module 116 to a eUICC interface 120. The first network authentication request may have been received via the communications interface 114 and/or may have been received from a network operator. In an instance in which a second network subscription is currently activated, the subscription module 116, the eUICC interface 120, and/or the eUICC 118 may be configured to cause the second network subscription to be deactivated and the first network subscription to be activated as is shown in signals 606-616. In an instance in which the first network subscription is activated, then signaling may start with the authentication request in signal 620 as is described herein.

In particular, the eUICC interface 120 may communicate a signal to activate a first network subscription in signal 606. The eUICC 118 may acknowledge the activation request in signal 608. In response to a Fetch command from the eUICC interface 120 in signal 610, the UICC may cause a refresh command to be signaled to the eUICC interface 120 in signal 614. The eUICC interface 120 may then cause the UICC to reset in signal 614 which is acknowledged in signal 616. As is described herein, because the eUICC interface 120 is configured to determine that because the reset was related to a change of subscription in response to a authentication request, the eUICC interface 120 and/or the subscription module 116 would not be configured to cause the mobile terminal 10 or any operating applications to reset.

As is shown in box 618, the first network subscription is activated and the second network subscription is deactivated after signals 606-618. The eUICC interface 120 may then request authentication information from the eUICC 118 in signal 620 and such authentication information may be provided in the form of an acknowledgement in signal 622 to the eUICC interface 120 and/or to a subscription module 116 in signal 624. The subscription module 116, may cause, such as via the processor 110, the communications interface 114 or the like, the authentication information to be transmitted to the network.

Figure 6:
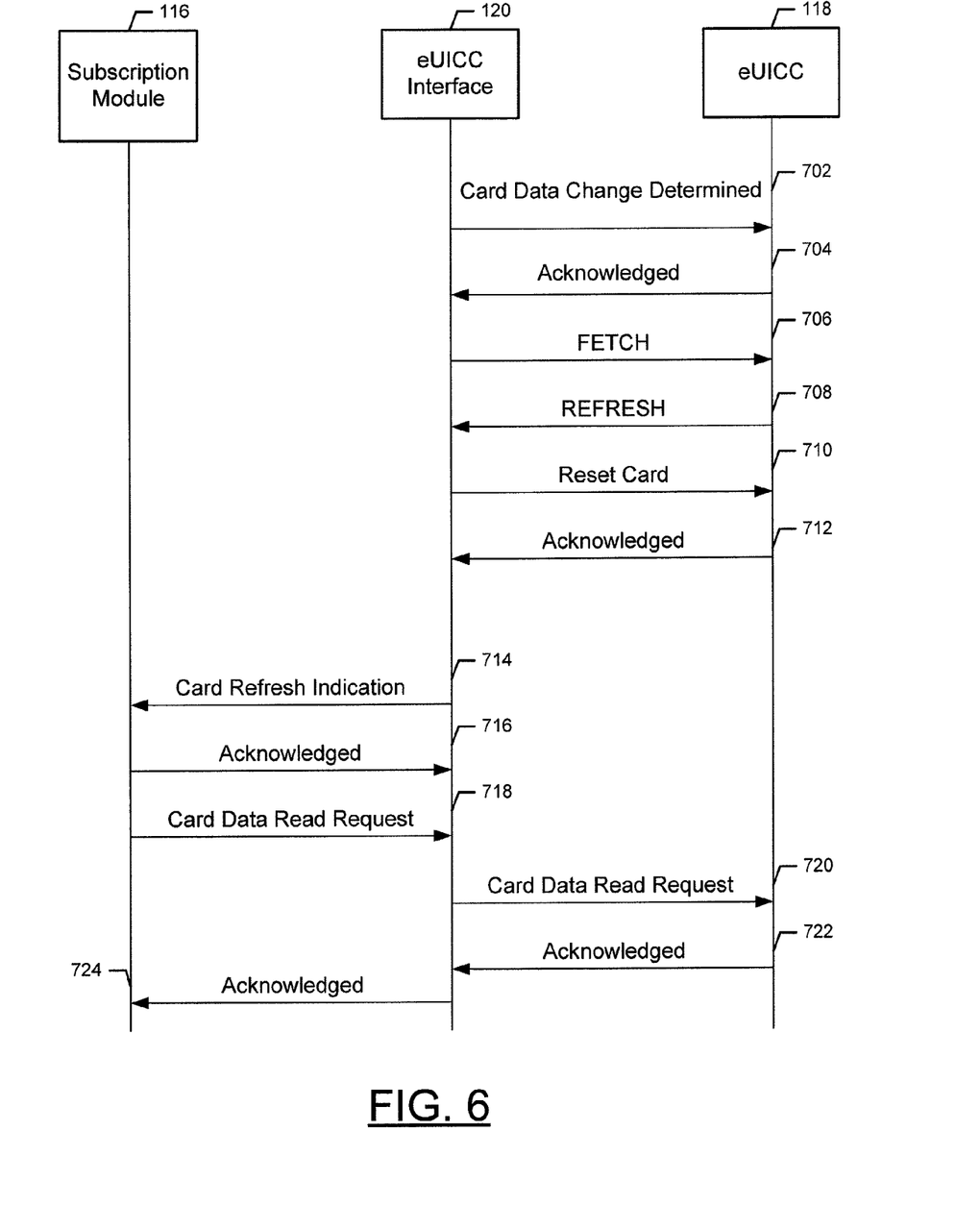
FIG. 6 illustrates an example signal flow diagram for a Refresh command according to some example embodiments of the present invention.

FIG. 6 illustrates an example signal flow diagram for a Refresh command according to some example embodiments of the present invention. In particular FIG. 6 illustrates a Refresh command which is used by a eUICC 118 to indicate to the mobile terminal 10 that at least some data related to the eUICC has changed and therefore affected software components of the mobile terminal 10 may be configured to renew any card data that they may have been cached in the memory 112.

In particular the eUICC interface 120 may be configured to communicate a signal to Refresh to the eUICC 118, such as in an instance in which the processor, the subscription module 116 or like determines a data change with respect to the UICC in signal 702. In response, the eUICC 118 may acknowledge the activation request in signal 704. In response to a Fetch command from the eUICC interface 120 in signal 706, the UICC may cause a refresh command to be signaled to the eUICC interface 120 in signal 708. The eUICC interface 120 may then cause the eUICC 118 to reset in signal 710 which is acknowledged in signal 712.

In contrast to signal flow diagram shown with respect to FIG. 5, the eUICC interface 120 is configured in FIG. 6 to cause the mobile terminal 10 to renew affected software components and thus at signal 714, the eUICC interface 120 may signal a card refresh indication to the subscription module 116. The subscription module 116 may acknowledge the card refresh indication at signal 716. The subscription module 116, such as by the processor 110, may then cause the affected software components to renew cached subscription data such as via signals 718 and 720. Such a renew request may be acknowledged in signals 722 and 724.

Advantageously, the subscription management system 102, method and computer program product as described herein enables a mobile terminal 10 to provide a eUICC or a UICC that is configured to host a plurality of vUICCs thereby providing the ability to emulate a plurality of SIMs. As is described herein the methods and systems may be used on either a UICC, eUICC or as a vUICC. Additionally or alternatively, the subscription management system 102, method and computer program product as described herein allows for operation on existing UICCs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be comprised within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a network authentication request from a first network operator;
   causing, using a processor, a command to be transmitted to a universal integrated circuit card, wherein the command is configured to cause the universal integrated circuit card to activate a subscription for the first network operator and deactivate a subscription for a second network operator in an instance in which the subscription for the first network operator is not an active subscription, wherein the activating the subscription for the first network operator and deactivating the subscription for the second network operator causes a reset of the universal integrated circuit card without causing a reset of the mobile terminal;
   causing authentication information to be transmitted to the first network operator based on the subscription for the first network operator; and
   wherein the command is configured to cause a switch between two active subscriptions stored on the universal integrated circuit card while maintaining the same universal integrated circuit card data read from the universal integrated circuit card during start-up.

2. A method according to claim 1, further comprising:
   causing authentication information to be transmitted to the first network operator in an instance in which the subscription for the first network operator is activated.

3. A method according to claim 1 wherein the network authentication request is received during at least one of a call mode or a standby mode.

4. A method according to claim 1, further comprising:
   causing two or more subscriptions to be activated based one an International Mobile Subscriber Identity and network related access data.

5. A method according to claim 4, further comprising:
   determining a personal identification number in an instance in which a personal identification number is required for activation of at least one of the two or more subscriptions.

6. A method according to claim 1, further comprising:
   receiving an indication from a user interaction with a user interface, wherein the indication relates to a subscription from a first network operator;

causing a command to be transmitted to a universal integrated circuit card, wherein the command is configured to cause the universal integrated circuit card to activate a subscription for the first network operator and deactivate a subscription for a second network operator in an instance in which the subscription for the first network operator is not an active subscription; and causing data to be communicated with the first network operator based on the indication.

7. A method according to claim 1 wherein the universal integrated circuit card is at least one of a physical universal integrated circuit card or an embedded universal integrated circuit card.

8. An apparatus comprising:
a universal integrated circuit card with an interface and two or more active subscriptions;
at least one processor; and
at least one memory including computer program code, the at least one memory and the computer program code configured to, with the at least one processor, cause the apparatus to at least:
receive, at a mobile terminal, a network authentication request from a first network operator;
cause a command to be transmitted to the universal integrated circuit card, wherein the command is configured to cause the universal integrated circuit card to activate a subscription for the first network operator and deactivate a subscription for a second network operator in an instance in which the subscription for the first network operator is not an active subscription, wherein the activating the subscription for the first network operator and deactivating the subscription for the second network operator causes a reset of the universal integrated circuit card without causing a reset of the mobile terminal;
cause authentication information to be transmitted to the first network operator based on the subscription for the first network operator; and
wherein the command is configured to cause a switch between two active subscriptions stored on the universal integrated circuit card while maintaining the same universal integrated circuit card data read from the universal integrated circuit card during start-up.

9. An apparatus according to claim 8, wherein the at least one memory including the computer program code is further configured to, with the at least one processor, cause the apparatus to:
cause authentication information to be transmitted to the first network operator in an instance in which the subscription for the first network operator is activated.

10. An apparatus according to claim 8 wherein the network authentication request is received during at least one of a call mode or a standby mode.

11. An apparatus according to claim 8, wherein the at least one memory including the computer program code is further configured to, with the at least one processor, cause the apparatus to:
cause two or more subscriptions to be activated based one an International Mobile Subscriber Identity and network related access data.

12. An apparatus according to claim 11, wherein the at least one memory including the computer program code is further configured to, with the at least one processor, cause the apparatus to:
determine a personal identification number in an instance in which a personal identification number is required for activation of at least one of the two or more subscriptions.

13. An apparatus according to claim 8, wherein the at least one memory including the computer program code is further configured to, with the at least one processor, cause the apparatus to:
receive an indication from a user interaction with a user interface, wherein the indication relates to a subscription from a first network operator;
cause a command to be transmitted to a universal integrated circuit card, wherein the command is configured to cause the universal integrated circuit card to activate a subscription for the first network operator and deactivate a subscription for a second network operator in an instance in which the subscription for the first network operator is not an active subscription; and
cause data to be communicated with the first network operator based on the indication.

14. An apparatus according to claim 8 wherein the universal integrated circuit card is at least one of a physical universal integrated circuit card or an embedded universal integrated circuit card.

15. A computer program product comprising:
at least one computer readable non-transitory memory medium having program code stored thereon, the program code which when executed by an apparatus with the at least one processor cause the apparatus at least to:
receive, at a mobile terminal, a network authentication request from a first network operator;
cause a command to be transmitted to a universal integrated circuit card, wherein the command is configured to cause the universal integrated circuit card to activate a subscription for the first network operator and deactivate a subscription for a second network operator in an instance in which the subscription for the first network operator is not an active subscription, wherein the activating the subscription for the first network operator and deactivating the subscription for the second network operator causes a reset of the universal integrated circuit card without causing a reset of the mobile terminal;
cause authentication information to be transmitted to the first network operator based on the subscription for the first network operator; and
wherein the command is configured to cause a switch between two active subscriptions stored on the universal integrated circuit card while maintaining the same universal integrated circuit card data read from the universal integrated circuit card during start-up.

16. A computer program product according to claim 15, further comprising program code instructions configured to:
cause two or more subscriptions to be activated based one an International Mobile Subscriber Identity and network related access data.

17. A computer program product according to claim 15 wherein the universal integrated circuit card is at least one of a physical universal integrated circuit card or an embedded universal integrated circuit card.

* * * * *

UNITED STATES PATENT AND TRADEMARK OFFICE
CERTIFICATE OF CORRECTION

| | |
|---|---|
| PATENT NO. | : 8,954,067 B2 |
| APPLICATION NO. | : 13/336828 |
| DATED | : February 10, 2015 |
| INVENTOR(S) | : Madsen |

It is certified that error appears in the above-identified patent and that said Letters Patent is hereby corrected as shown below:

In the claims

Column 14,
Line 26, "receiving a network authentication request" should read --receiving, at a mobile terminal, a network authentication request--;
Line 57, "one an International Mobile Subscriber Identity" should read --on an International Mobile Subscriber Identity--.

Column 15,
Lines 56 and 57, "one an International Mobile Subscriber Identity" should read --on an International Mobile Subscriber Identity--.

Signed and Sealed this
Seventeenth Day of November, 2015

Michelle K. Lee
*Director of the United States Patent and Trademark Office*